(12) United States Patent
Woo et al.

(10) Patent No.: US 10,274,734 B2
(45) Date of Patent: Apr. 30, 2019

(54) PERSONAL IMMERSIVE DISPLAY DEVICE AND DRIVING METHOD THEREOF

(71) Applicant: LG Display Co., Ltd., Seoul (KR)

(72) Inventors: Kyoungdon Woo, Paju-si (KR); Jaeyoon Bae, Seoul (KR)

(73) Assignee: LG Display Co., Ltd., Seoul (KR)

(*) Notice: Subject to any disclaimer, the term of this patent is extended or adjusted under 35 U.S.C. 154(b) by 42 days.

(21) Appl. No.: 15/679,777

(22) Filed: Aug. 17, 2017

(65) Prior Publication Data

US 2018/0059420 A1  Mar. 1, 2018

(30) Foreign Application Priority Data

Aug. 31, 2016 (KR) .......... 10-2016-0112188

(51) Int. Cl.
*G09G 3/00* (2006.01)
*G02B 27/00* (2006.01)
*G02B 27/01* (2006.01)

(52) U.S. Cl.
CPC ....... *G02B 27/0172* (2013.01); *G02B 27/017* (2013.01); *G09G 3/003* (2013.01); *G02B 27/0093* (2013.01); *G02B 2027/0163* (2013.01); *G02B 2027/0187* (2013.01); *G09G 2354/00* (2013.01)

(58) Field of Classification Search
CPC ................................... H04N 5/7491
See application file for complete search history.

(56) References Cited

U.S. PATENT DOCUMENTS

| | | |
|---|---|---|
| 2014/0333521 A1* | 11/2014 | Hwang ............ G06F 3/013 345/156 |
| 2017/0038590 A1* | 2/2017 | Jepsen ............ G02B 27/0172 |
| 2017/0315372 A1* | 11/2017 | Bang ............ G02B 3/0037 |
| 2018/0018018 A1* | 1/2018 | Klingstrom ............ G02B 27/01 |
| 2018/0033405 A1* | 2/2018 | Tall ............ G06F 3/013 |
| 2018/0061116 A1* | 3/2018 | Mitchell ............ G06T 15/20 |
| 2018/0224935 A1* | 8/2018 | Thunstrom ............ G06F 3/013 |

* cited by examiner

Primary Examiner — Priyank J Shah
(74) Attorney, Agent, or Firm — Polsinelli PC (57) ABSTRACT

A personal immersive display device and a driving method thereof are disclosed. The display device comprises a first display panel to which first content data is provided; a second display panel to which second content data is provided; a camera that receives data associated with positions of a user's left pupil and right pupil; and a data processor that processes the data associated with the position of the user's left pupil and right pupil to determine a right gaze point and a left gaze point, detects a first gaze area on the first display panel and a second gaze area on the second display panel based on the right gaze point and left gaze point, wherein the data processor reduces resolution or brightness of the first and second content data provided to areas outside the first gaze area and second gaze area.

17 Claims, 10 Drawing Sheets

PERSONAL IMMERSIVE DISPLAY DEVICE AND DRIVING METHOD THEREOF

CROSS-REFERENCE TO RELATED APPLICATION

This application claims the benefit of Korean Patent Application No. 10-2016-0112188 filed on Aug. 31, 2016, which is incorporated herein by reference for all purposes as if fully set forth herein.

BACKGROUND

The present disclosure relates to a personal immersive display device for virtual reality and a driving method thereof.

DISCUSSION OF THE RELATED ART

Virtual reality technology is used in military, architecture, tourism, movies, multimedia, gaming, etc. Virtual reality refers to a specific environment or situation that replicates a real environment through the use of three-dimensional image technology. In order to maximize the sense of immersion in virtual reality, virtual reality technology is now being applied to personal immersive displays. Typical examples of personal immersive display applications include HMD (head mounted display), FMD (face mounted display), EGD (eye glasses-type display).

Recently, research on and development of personal immersive displays has been actively underway because of their versatility.

A personal immersive display usually displays images only for a single user. Thus, there is a need for a method of displaying images in a more user-oriented way.

Moreover, personal immersive displays are often worn on a human body. Due to this, they often rely on built-in batteries for power supply. Accordingly, power consumption reduction is one of the important things that need to be done to make better use of personal immersive displays.

SUMMARY

Accordingly, the present disclosure is directed to a personal immersive display comprising first and second pixel arrays, a camera, and a data processor. First image data and second image data for the left and right eyes are written to the first and second pixel arrays, respectively. The camera captures the positions of the pupils of the user's left and right eyes. The data processor detects the point of the user's gaze based on the pupil positions, detects gaze areas on the first and second pixel arrays based on the point of gaze, and reduces the resolution or brightness of the first and second image data written to non-gaze areas, which correspond to the rest of the first and second pixel arrays, excepting the gaze areas.

BRIEF DESCRIPTION OF THE DRAWINGS

The accompanying drawings, which are included to provide a further understanding of the disclosure and are incorporated in and constitute a part of this specification, illustrate embodiments of the disclosure and together with the description serve to explain the principles of the disclosure. In the drawings.

DETAILED DESCRIPTION OF THE ILLUSTRATED EMBODIMENTS

Hereinafter, exemplary embodiments of the present disclosure will be described in detail with reference to the attached drawings. Throughout the specification, like reference numerals denote substantially like components. In describing the present disclosure, a detailed description of known functions or configurations related to the present disclosure will be omitted when it is deemed that they may unnecessarily obscure the subject matter of the present disclosure.

Figure 1:
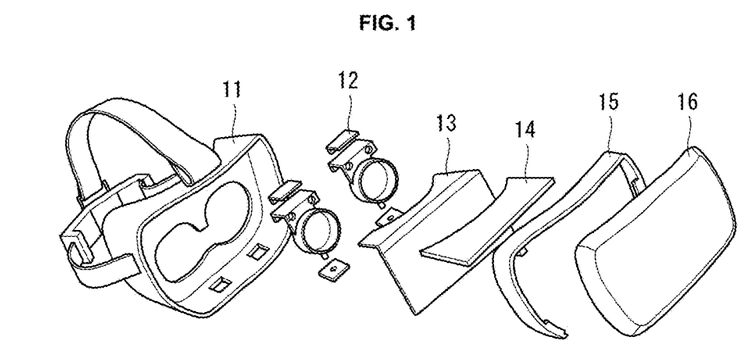
FIG. 1 is an exploded perspective view of a personal immersive display according to an exemplary embodiment of the present disclosure.

Referring to FIG. 1, a personal immersive display according to the present disclosure comprises a lens module 12, a display module 13, a mainboard 14, a head gear 11, a side frame 15, and a front cover 16.

The display module 13 comprises a display panel drive circuit for driving two display panels, and displays an input image received from the mainboard 14. The display panels are separated into a first display panel which is seen from the user's left eye and a second display panel which is seen from the user's right eye. The display module displays image data fed from the mainboard on the display panels. The image data may be 2D/3D image data for creating video images of virtual reality (VR) or augmented reality (AR). The display module 13 may display various information fed from the mainboard 14 in multiple forms, including at least text form or symbolic form.

The lens module 12 comprises super wide-angle lenses, i.e., a pair of fisheye lenses, for widening the viewing angle of the user's left and right eyes. The pair of fisheye lenses comprises a left-eye lens placed in front of the first display panel and a right-eye lens placed in front of the second display panel.

Figure 7:
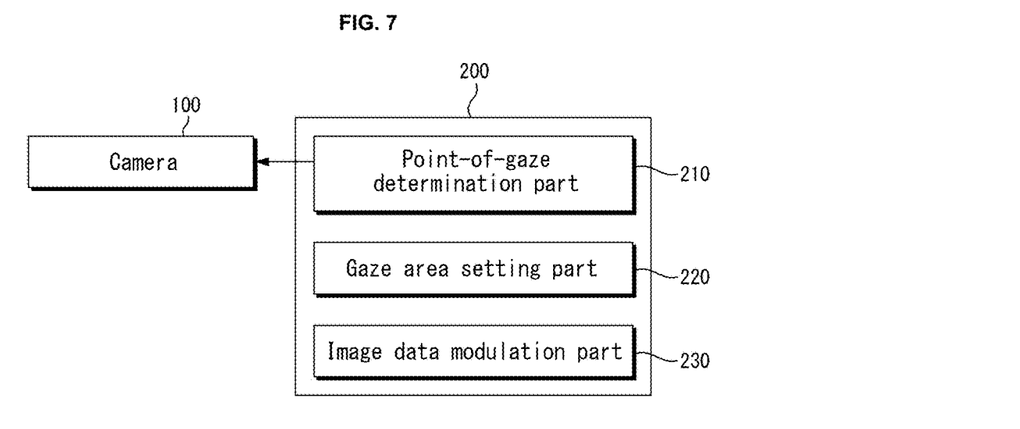
FIG. 7 is a block diagram showing the configuration of a data processor.

A camera may be placed at the lens module 12 to capture the point of the user's gaze. As shown in FIG. 7, the camera captures the two eyes of the user and transmits the captured data to a data processor 200.

The mainboard 14 comprises a processor that executes virtual reality software and delivers a left-eye image and a right-eye image to the display module 13. Moreover, the mainboard 14 further comprises an interface module, a sensor module, etc. that are connected to external devices. The interface module is connected to external devices via interfaces such as Universal Serial Bus (USB), High-Definition Multimedia Interface (HDMI), etc. The sensor module comprises various sensors such as a gyro-sensor, an accelerometer, etc. The processor at the mainboard 14 corrects left-eye and right-eye image data in response to an output signal from the sensor module, and transmits left-eye and right-eye image data of an input image received via the interface module to the display module 13. The processor may create a left-eye image and right-eye image matching the resolution of the display panel based on a result of analysis of depth information from 2D images and transmit them to the display module 13.

The head gear 11 comprises a back cover exposing the fisheye lenses and a band connected to the back cover. The back cover of the head gear 11, the side frame 15, and the front cover 16 are assembled to provide an internal space where the components of the personal immersive display are placed and to protect these components. The components comprise the lens module 12, the display module 13, and the mainboard 14. The band is connected to the back cover. The user can wear the personal immersive display on their head by using the band. Once the personal immersive display is put on their head, the user sees the different display panels from the left and right eyes through the fisheye lenses.

The side frame 15 is fixed between the head gear 11 and the front cover 16, making a gap in the internal space where the lens module 12, the display module 13, and the mainboard 14 are placed. The front cover 16 is placed at the front of the personal immersive display.

The personal immersive display of this disclosure may be implemented in an HMD (head mounted display) structure shown in FIG. 1, as one possible example. Another example is for the present disclosure to be designed as an EGD (eye glasses-type display).

Figure 2:
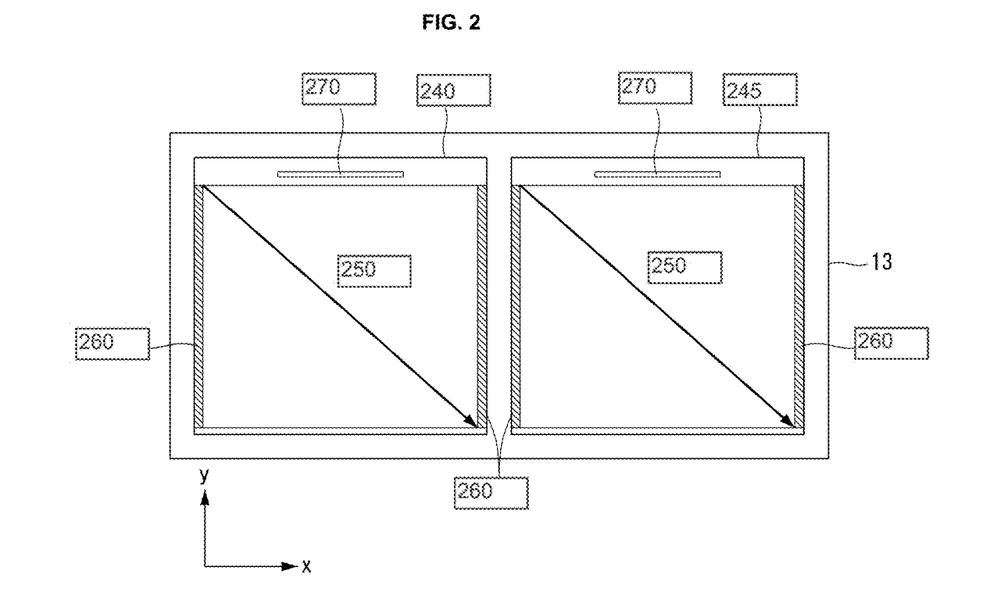
FIG. 2 is a view of first and second display panels in the display module of FIG. 1.
Figure 3:
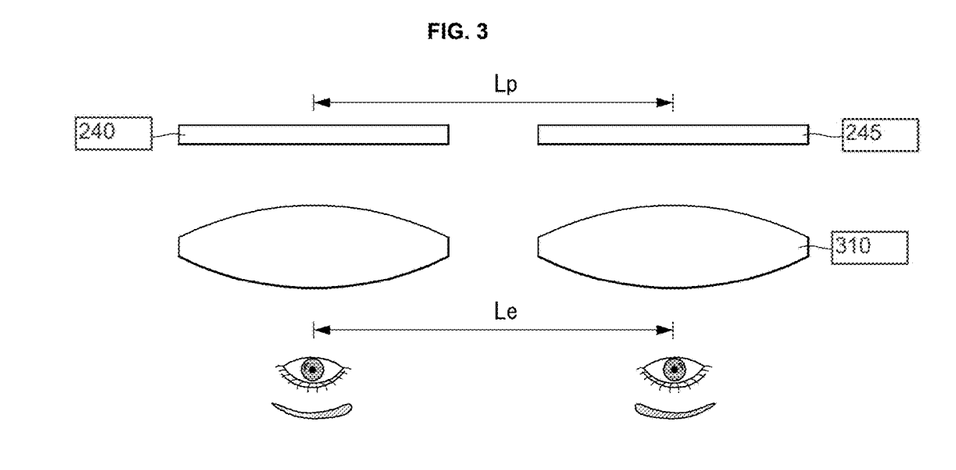
FIG. 3 is a view of the distance between the first and second display panels of FIG. 2.

FIG. 2 is a view of first and second display panels PNL1 240 and PNL2 245, to which first and second content data (or image data) are provided respectively, in the display module 13 of FIG. 1. FIG. 3 is a view of the distance between the first and second display panels PNL1 and PNL2 of FIG. 2. The first and second display panels PNL1 240 and PNL2 245 are implemented as organic light-emitting diode (hereinafter, "OLED") display panels which have fast response time, excellent color reproduction, and wide viewing angle. In the case of EGD, the display panels PNL1 240 and PNL2 245 may be implemented as transparent OLED display panels.

Referring to FIGS. 2 and 3, the first and second display panels PNL1 240 and PNL2 245 are manufactured separately and spaced apart from each other on the display module 13.

A DIC 270 (Drive Integrated Circuit) is an integrated circuit (IC) chip integrated with a timing controller and a data driver. A GIP 260 (Gate In Panel) corresponds to a gate driver, and outputs a scan signal and an emission signal. The GIP 260 is integrated on the same substrate, along with a pixel array.

The distance $L_p$ between the center of the pixel array of the first display panel PNL1 240 and the center of the pixel array of the second display panel PNL2 245 is substantially equal to the distance $L_e$ between the two eyes of the user. The distance $L_p$ between the center of the pixel array of the first display panel PNL1 and the center of the pixel array of the second display panel PNL2 may be set to $L_e \pm \alpha$. The distance $L_e$ between the user's two eyes, which is the distance between the left pupil and the right pupil, is approximately 6.5 cm (=65 mm), and may vary for each individual user. $\alpha$ is a design margin which is added to take into account the display panel drive circuit placed between the first and second display panels PNL1 240 and PNL2 245, process deviation, etc., and may be set to 10% of $L_e$.

Each of the pixel arrays AA 250 of the first and second display panels PNL1 240 and PNL2 245 has a landscape aspect ratio, which is longer along the horizontal axis x than the vertical axis y, with the vertical viewing angle and the horizontal viewing angle taken into account. The viewing angle of personal immersive displays can be improved more by widening the horizontal viewing angle than the vertical viewing angle. In the present disclosure, the first and second display panels PNL1 240 and PNL2 245 are manufactured as landscape-type OLED display panels.

In the landscape aspect ratio, the number of pixels on the horizontal axis x is greater than the number of pixels on the vertical axis y, and the length of the horizontal axis x is longer than the length of the vertical axis y. Meanwhile, in a portrait aspect ratio, the number of pixels on the vertical axis y is greater than the number of pixels on the horizontal axis x, and the length of the vertical axis y is longer than the length of the horizontal axis x.

Comparison tests on different display panels for personal immersive displays were conducted to determine the user's sense of 3D, sense of immersion, and sense of fatigue are. According to the test results, it was found out that the user's sense of 3D was greatly improved when the pixel arrays of the display panels PNL1 240 and PNL2 245, spaced apart from each other by the distance between the user's two eyes, are separated from each other. Wide viewing angles and large improvements to the sense of 3D can be achieved when the pixel arrays of the display panels PNL1 240 and PNL2 245 are separated and the distance between the centers of the pixel arrays matches the distance between the user's left and right eyes. In the personal immersive display of this disclosure, the user's left pupil matches the center of the first pixel array and the user's right pupil matches the center of the second pixel array.

The user gets a stronger sense of 3D with the landscape aspect ratio than with the portrait aspect ratio. The present disclosure can improve the sense of 3D by placing landscape-type display panels for the left and right eyes separately.

The pixel arrays AA may be placed on separate substrates on a 1:1 basis, so that the first pixel array AA for displaying a left-eye image and the second pixel array AA for displaying a right-eye image are separated from each other. In this case, the first pixel array is placed on the substrate for the first display panel PNL1 240, and the second pixel array AA is placed on the substrate for the second display panel PNL2 245. In other embodiments, the first and second pixel arrays may be separated from each other on a single substrate. In this case, the pixel arrays are separated from each other on a single display panel. When the pixel arrays are separated, it means that their data lines, gate lines (or scan lines), and pixels are separated. The first and second pixels, although separated, may share at least part of the display panel drive circuit because they can be driven by the same driving signal system.

Placing two pixel arrays AA separately on a single substrate may offer many other various benefits, apart from the improvements to the sense of 3D. In the case of one of the conventional VR devices, a single pixel array is formed on a single substrate, and a left-eye image and a right-eye image are displayed on that pixel array—which means that there are no separate pixel arrays. The present disclosure uses two separate display panels PNL1 240 and PNL2 245 where two pixel arrays AA are separated from each other or uses a single substrate where the two pixel arrays AA are placed separately. Thus, the present disclosure uses separate pixel arrays. Due to this difference, the present disclosure allows more design freedom in placing pixel arrays as compared to the conventional art, and can maximize the sense of 3D by placing the pixel arrays AA corresponding to a human's left and right eyes on a 1:1 basis, in an aspect ratio for the best viewing angle.

In terms of productivity, a display panel structure of this disclosure helps to decrease defect rates and increase yield as the pixel array area is decreased.

When the distance between the pixel arrays AA 250 is decreased, the screen size is reduced, making display images narrower. When the distance between the pixel arrays AA 250 is increased, the centers of the pixel arrays corresponding to the user's two eyes are shifted to the outer edge of the screen, which may reduce the sense of immersion and the sense of 3D. The distance between a human's two eyes is 65 mm, and users of personal immersive displays are able to get the strongest sense of 3D in 3D images when the center points of the separated pixel arrays AA 250 precisely match the pupils of both eyes. If the distance between the pixel arrays is too narrow or wide, a left-eye image and a right-eye image can be adjusted according to the distance between the user's two eyes by optically compensating for viewing angles by fisheye lenses (LENS) or by image processing. This method, however, may decrease display efficiency in terms of viewing angles. In other words, as in the present disclosure, the user can see most accurate 3D images when the pixel arrays are separated and the centers of the pixel arrays are placed corresponding exactly to the user's left and right eyes on a 1:1 basis.

In the personal immersive display, a fisheye lens (LENS) 310 exists between the user's eye and a display panel, and the distance between the user's eye and the display panel is very short—that is, several centimeters. When the user sees a reproduced image on the display panels PNL1 240 and PNL2 245, the image is seen magnified 4 to 5 times the actual screen displayed on the display panels PNL1 and PNL2. In such an environment where close-range visibility and fisheye lenses are applied, if the display panel has a low resolution, the pixels have more non-emissive area, thus giving the user a strong screen-door effect and reducing the sense of immersion. In order to increase the sense of immersion with the personal immersive display, the pixel arrays of the first and second display panels PNL1 240 and PNL2 245 have a resolution of quad high definition (QHD) (1440×1280) or higher, a pixel density of 500 ppi (pixels per inch) or higher, and a pixel aperture ratio of 14% or higher. In 1440×1280, 1440 is the number of pixels on the horizontal axis x of the pixel arrays, and 1280 is the number of pixels on the vertical axis y of the pixel arrays. In view of the technological level of mass-producible OLED display panels, the pixel density may range from 500 ppi to 600 ppi, and the pixel aperture ratio may range from 14% to 20%.

If total latency is long when the personal immersive display displays a 3D video, display lagging or motion blur may be perceived. Screen stuttering or motion blur in 3D videos may increase the user's fatigue, as well as degrading image quality. Total latency is the sum of the system processing time required for the mainboard 14 to process data and transmit it to the display module 13 and the delay time of the display module 13. The delay time of the display module 13 is the sum of the frame delay time of an input image during one frame period and the pixel response time.

The present disclosure can decrease the user's fatigue when the personal immersive display displays 3D video by shortening pixel response time and increasing frame rate (or refresh rate). To this end, in the present disclosure, the switching elements and driving elements of the pixels on the display panels PNL1 and PNL2 are manufactured as n-type MOSFET (metal oxide semiconductor) to deliver a fast pixel circuit response time of 2 msec or less and a frame rate of 90 Hz or higher to get faster data update intervals. When the frame rate is 90 Hz, 1 frame period, which equals a data update interval, is approximately 11.1 ms. Accordingly, the present disclosure can reduce total latency to 25 ms or less by reducing the delay time of the display module 13 in the personal immersive display to approximately 13 ms. Data of an input image is addressed to the pixels at each data update interval.

Figure 4:
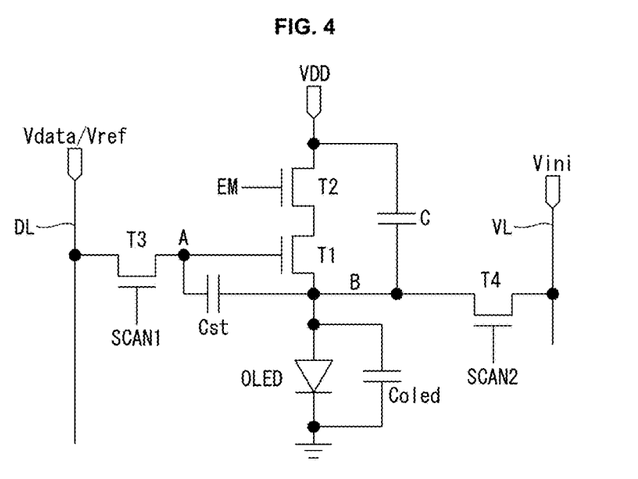
FIG. 4 is a schematic view of part of a pixel array of FIG. 2.
Figure 5:
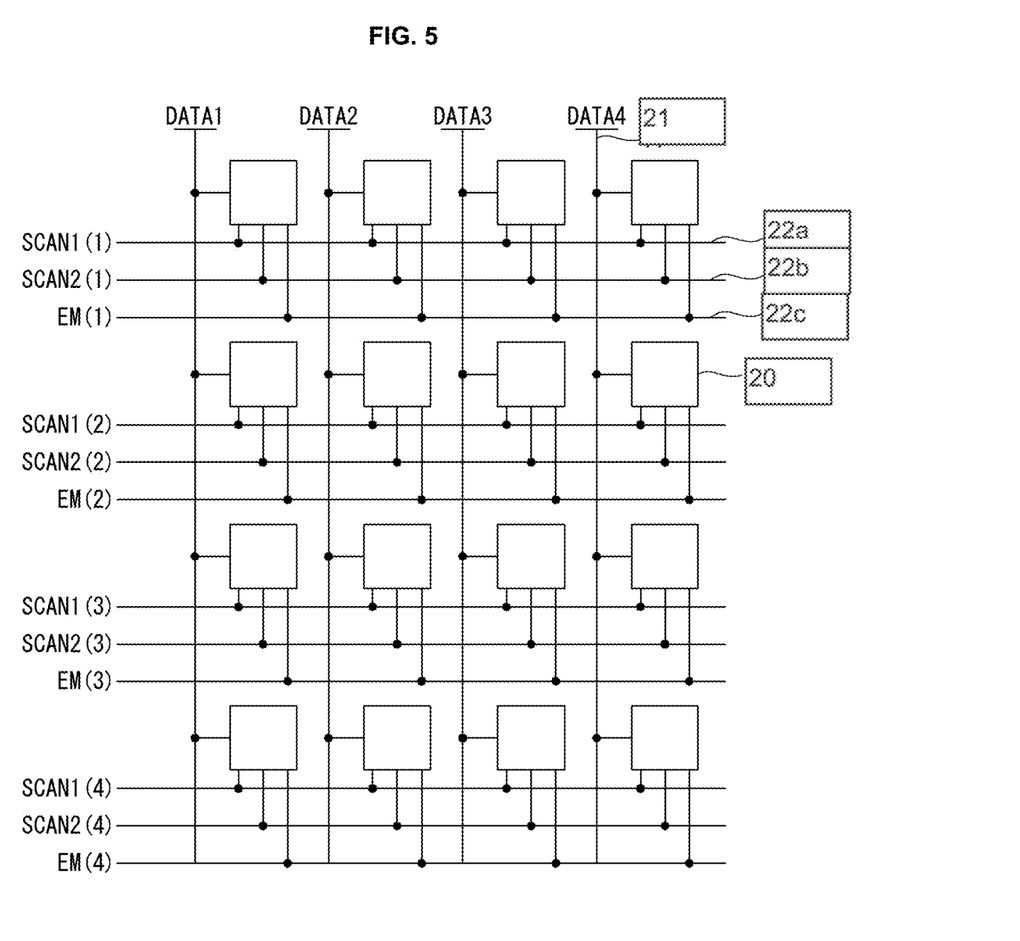
FIG. 5 is an equivalent circuit diagram of one example of a pixel circuit.
Figure 6:
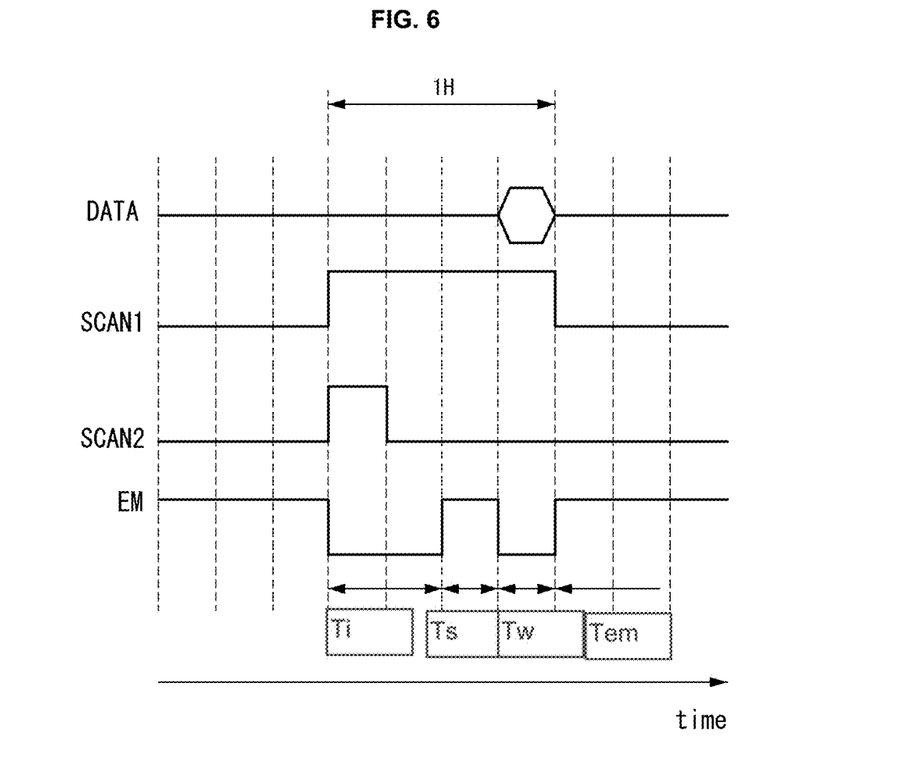
FIG. 6 is a waveform diagram of signals fed to the pixel of FIG. 5.

FIG. 4 is a schematic view of part of a pixel array of FIG. 2. FIG. 5 is an equivalent circuit diagram of one example of a pixel circuit. FIG. 6 is a waveform diagram of signals fed to the pixel of FIG. 5.

Referring to FIGS. 4 to 6, each of the display panels PNL1 240 and PNL2 245 according to the exemplary embodiment of the present disclosure comprises a pixel array AA 250 for displaying an input image and a display panel drive circuit for writing data of the input image to the pixel array AA 250.

The display panel drive circuit comprises a data driver, a gate driver, an emissions driver, and a timing controller. As explained previously, the data driver and the timing controller are integrated with a drive IC (DIC), and the gate driver and the emissions driver may be placed on a GIP.

Moreover, the display panel drive circuit comprises a power circuit which is not shown. The power circuit generates electric power required to drive the data driver, gate driver, emissions driver, timing controller, and display panels PNL1 and PNL2.

At least part of the display panel drive circuit may be placed on the surface of a substrate between the first and second pixel arrays. At least part of the display panel drive circuit may be shared by the first and second display panels PNL1 and PNL2. The display panel drive circuit addresses data to the pixels 20 of the display panels PNL1 and PNL2 at a high frame rate of 90 Hz or higher and write the data to the pixels.

In a pixel array AA, a plurality of data lines 21 and a plurality of gate lines 22a, 22b, and 22c intersect each other, and pixels 20 are arranged in a matrix. The pixel array AA comprises a reference voltage line (hereinafter, "REF line") VL connected commonly to the pixels 20 and a $V_{DD}$ line (not shown) for supplying a high-level driving voltage $V_{DD}$ to the pixels 20. A predetermined reset voltage $V_{ini}$ may be supplied to the pixels 20 through the REF line VL.

The gate lines 22a, 22b, and 22c comprise a plurality of first scan lines 22a to which a first scan pulse SCAN1 is supplied, a plurality of second scan lines 22b to which a second scan pulse SCAN2 is supplied, and a plurality of emissions signal lines 22c to which an emission signal is supplied.

Each of the pixels 20 is divided into a red subpixel, a green subpixel, and a blue subpixel to reproduce colors. Each pixel 20 may further comprise a white subpixel. Wiring lines such as a single data line 21, gate lines 22a, 22b, and 22c, an REF line VL, and a $V_{DD}$ line are connected to each pixel.

One frame period is divided into a scanning period in which data is addressed to the pixels and data of an input image is written to each pixel and a duty driving period, subsequent to the scanning period, in which the pixels emit light at a preset duty ratio in response to an alternating current emission signal. The alternating current emission signal is generated with a duty ratio of 50% or less during the duty driving period to emit light with a duty ratio of 50% or less. The scanning period is only approximately one horizontal period, so most of one frame period corresponds to the duty driving period. The pixels 20 store a data voltage in the capacitor in the scanning period. The pixels 20 alternate between emission (or turn-on) and non-emission (turn-off) in response to the alternating current emission signal. Each pixel 20 alternates between turn-on and turn-off within one frame period. That is, each pixel 20 repeatedly turns on and off to emit light with a duty ratio of 50% or less. The pixels 20 are driven with a duty ratio of 50% or less, without requiring more data voltage, during the duty driving period subsequent to the scanning period, as they turn off and then emit light by the voltage stored in their capacitor. Thus, data can be displayed with the same brightness during one frame period.

The data driver converts data of an input image received from the timing controller to a gamma compensation voltage under control of the timing controller to generate a data voltage, and outputs the data voltage to the data lines 21. The data driver may output a predetermined reference voltage $V_{ref}$ to the data lines during the reset period $T_i$, in order to reset the driving elements of the pixels 20.

The gate driver supplies the first and second scan pulses SCAN1 and SCAN2 to the scan lines 22a and 22b under control of the timing controller. The first and second scan pulses SCAN1 and SCAN2 are synchronized with the data voltage. The first scan pulse SCAN1 is kept at ON level when the data voltage is supplied to the pixels to turn on the switching element T3 and therefore to select pixels 20 to be charged with the data voltage. The second scan pulse SCAN2 rises simultaneously with the first scan pulse SCAN1 and falls earlier than the first scan pulse SCAN2 to reset the pixels 20 during the reset period $T_i$. The second scan pulse SCAN2 rises simultaneously with the first scan pulse SCAN1 and falls before a sampling period $T_s$.

The gate driver sequentially supplies the scan pulses SCAN1 and SCAN2 to the scan lines 22a and 22b by shifting these pulses by a shift register. The shift register of the gate driver, along with the pixel array AA, may be formed directly on the substrate of the display panel by GIP (gate-in-panel) technology.

The emission driver is a duty driver that outputs an emission signal and supplies it to the emission signal lines 22c under control of the timing controller. The emission driver sequentially supplies the emission signal to the emission signal lines 22c by shifting the emission signal by a shift register. The emission driver repetitively toggles to the emission signal to drive the pixels with a duty ratio of 50% or less during the duty driving period under control of the timing controller. The shift register of the emission driver, along with the pixel array AA, may be formed directly on the substrate of the display panel by GIP (gate-in-panel) technology.

The timing controller receives from the mainboard 14 digital video data DATA of left- and right-eye images and timing signals synchronized with the digital video data DATA. The timing signals comprise a vertical synchronization signal $V_{sync}$, a horizontal synchronization signal $H_{sync}$, a clock signal CLK, a data enable signal DE, etc. Based on a timing signal received from the mainboard 14 and preset register settings, the timing controller generates a data timing control signal for controlling the operation timing of the data driver, a gate timing control signal for controlling the operation timing of the gate driver, and a duty timing control signal for controlling the operation timing of the emission driver. The timing controller controls the duty ratio of an emission signal by using a duty timing control signal.

Notably, the timing controller comprises a data processor that detects a gaze area based on the point of the user's gaze and modulates image data of a non-gaze area. Details of the data processor will be described later.

Each of the pixels 20 comprises an OLED, a plurality of TFTs (thin-film transistors) T1 to T4, and a storage capacitor $C_{st}$. A capacitor C may be connected between the drain of the second TFT T2 and a second node B. In FIG. 4, "Coled" denotes the parasitic capacitance of the OLED. The TFTs are implemented as n-type MOSFETs. The pixels 20 sample the threshold voltage of the driving element T1 and receive a data voltage for an input image during the scanning period, and emit light with a duty ratio of 50% or less during the duty driving period Tem. The scanning period is divided into a reset period $T_i$ for resetting the pixels 20, a sampling period $T_s$ for sampling the threshold voltage of the driving elements of the pixels 20, and a programming period $T_w$ for supplying a data voltage of an input image to the pixels 20.

The OLED emits light by an electric current which is adjusted by the first TFT T1 in response to a data voltage output from the data driver. The OLED's current path is switched by the second TFT T2. The OLED comprises organic compound layers formed between an anode and a cathode. The organic compound layers comprise, but not limited to, a hole injection layer HIL, a hole transport layer HTL, an emission layer EML, and an electron transport layer ETL, and an electron injection layer EIL. The anode of the OLED is connected to the second node B, and the cathode is connected to a $V_{SS}$ electrode to which a low-level power voltage or a ground voltage $V_{SS}$ is applied. "Coled" denotes the parasitic capacitance between the anode and the cathode.

The first TFT T1 is a driving element that adjusts the current flowing through the OLED in response to a gate-source voltage $V_{gs}$. The first TFT T1 comprises a gate connected to a first node A, a drain connected to a source of the second TFT T2, and a source connected to the second node B.

The second TFT T2 is a switching element that switches the current flowing through the OLED in response to an emission signal. The emission signal is at ON level during the sampling period, and alternates between ON level and OFF level with a duty ratio of 50% or less during the duty driving period. The drain of the second TFT T2 is connected to a $V_{DD}$ line to which a high-level driving voltage $V_{DD}$ is supplied. The source of the second TFT T2 is connected to the drain of the first TFT T1. The gate of the second TFT T2 is connected to an emission signal line 22c to receive an emission signal. The emission signal is generated at ON level (or high logic level) during the sampling period $T_s$ to turn on the second TFT T2, and is then inverted to OFF level (or low logic level) during the programming period $T_w$ to turn off the second TFT T2. Also, the emission signal alternates between ON level and OFF level according to a PWM duty cycle during the duty driving period Tem so that the emission signal has a duty ratio of 50% or less. The OLED emits light with a duty ratio of 50% or less because the second TFT T2 is switched on in response to the emission signal.

The third TFT T3 is a switching element that supplies a data voltage $V_{data}$ to the first node A in response to a first scan pulse SCAN1. The third TFT T3 comprises a gate connected to a first scan line 22a, a drain connected to a data line 21, and a source connected to the first node A. The first scan pulse SCAN1 is supplied to the pixels 20 through the first scan line 22a. The first scan pulse SCAN1 is generated at ON level during approximately one horizontal period $1_H$ to turn on the third TFT T3, and is then inverted to OFF level during the duty driving period Tem to turn off the third TFT T3.

The fourth TFT T4 is a switching element that supplies a reset voltage Vini to the second node B in response to a second scan pulse SCAN2. The fourth TFT T4 comprises a gate connected to a second scan line 22b, a drain connected to an REF line VL, and a source connected to the second node B. The second scan pulse SCAN2 is supplied to the pixels 20 through the second scan line 22b. The second scan pulse SCAN2 is generated at ON level during the reset period $T_i$ to turn on the fourth TFT T4, and is then kept at OFF level during the remaining period to keep the fourth TFT T4 off.

The storage capacitor $C_{st}$ is connected between the first node A and the second node B and stores the differential voltage between the two ends and maintains the gate-source voltage $V_{gs}$ of the TFT T1. The storage capacitor $C_{st}$ samples the threshold voltage $V_{th}$ of the first TFT T1, a driving element, by a source-follower configuration. The capacitor C is connected between the $V_{DD}$ line and the second node B. When there is a change in the potential across the first node A according to the data voltage $V_{data}$ during the programming period $T_w$, the capacitors $C_{st}$ and C distribute the voltage to add it to the voltage of the second node B.

The scanning period of the pixel 20 is divided into a reset period $T_i$, a sampling period $T_s$, and a programming period $T_w$. The scanning period is set to approximately one horizontal period $1_H$, during which data is written to the pixels arranged on one horizontal line of the pixel array. During the scanning period, the threshold voltage of the first TFT T1 of the pixel 20 is sampled, and the data voltage is compensated by canceling out the threshold voltage. Thus, during one horizontal period $1_H$, data DATA of an input image is written to the pixel 20 after canceling out the threshold voltage of the driving element.

When the reset period $T_i$ begins, the first and second scan pulses SCAN1 and SCAN2 rise and are generated at ON level. At the same time, the emission signal falls and changes to OFF level. During the reset period $T_i$, the second TFT T2 turns off to switch the current path in the OLED off. The third and second TFTs T3 and T4 turn on during the reset period $T_i$. During the reset period $T_i$, a predetermined reference voltage $V_{ref}$ is supplied to the data line 21. During the reset period $T_i$, the voltage of the first node A is reset to the reference voltage $V_{ref}$, and the voltage of the second node B is reset to a predetermined reset voltage $V_{ini}$. After the reset period Ti, the second scan pulse SCAN2 changes to OFF level to turn off the fourth TFT T4. ON level is a gate voltage level for TFTs at which the switching elements T2 to T4 of the pixel turn on. OFF level is a gate voltage level at which the switching elements T2 to T3 of the pixel turn off.

During the sampling period $T_s$, the first scan pulse SCAN1 remains at ON level, and the second scan pulse SCAN2 remains at OFF level. The emission signal rises and changes to ON level when the sampling period $T_s$ begins. During the sampling period $T_s$, the second and third TFTs T2 and T3 turn on. During the sampling period $T_s$, the second TFT T2 turns on in response to the ON-level emission signal. During the sampling period $T_s$, the third TFT T3 remains in the on state by the ON-level first scan pulse SCAN1. During the sampling period $T_s$, the reference voltage $V_{ref}$ is supplied to the data line 21. During the sampling period $T_s$, the voltage of the first node A is kept at the reference voltage $V_{ref}$, whereas the voltage of the second node B rises by a drain-source current $I_{ds}$. According to this source follower configuration, the gate-source voltage $V_{gs}$ of the first TFT T1 is sampled as the threshold voltage $V_{th}$ of the first TFT T1, and the sampled threshold voltage $V_{th}$ is stored in the storage capacitor $C_{st}$. During the sampling period $T_s$, the voltage of the first node A is the reference voltage $V_{ref}$, and the voltage of the second node B is $V_{ref}-V_{th}$.

During the programming period $T_w$, the third TFT T3 remains in the on state by the ON-level first scan pulse SCAN1, and the other TFTs T1, T2, and T4 turn off. During the programming period $T_w$, a data voltage $V_{data}$ for an input image is supplied to the data line 21. The data voltage $V_{data}$ is applied to the first node A, and the voltage difference $V_{data}-V_{ref}$ across the first node A is distributed between the capacitors $C_{st}$ and C and applied to the second node B. In this way, the gate-source voltage $V_{gs}$ of the first TFT T1 is programmed. During the programming period $T_w$, the voltage of the first node A is the data voltage $V_{data}$, and the voltage of the second node B is "$V_{ref}-V_{th}+C'*(V_{data}-V_{ref})$", which is obtained by summing "$V_{ref}-V_{th}$", which is calculated during the sampling period $T_s$, and "$C'*(V_{data}-V_{ref})$", which is the result of the voltage distribution between the capacitors $C_{st}$ and C. Consequently, the gate-source voltage $V_{gs}$ of the first TFT T1 is programmed to "$V_{data}-V_{ref}+V_{th}-C'*(V_{data}-V_{ref})$" in the programming period $T_w$. Here, C' equals $C_{st}/(C_{st}+C)$.

When the duty driving period term begins, the emission signal rises and changes back to ON level. On the other hand, the first scan pulse SCAN1 falls and changes to OFF level. During the duty driving period $T_{em}$, the second TFT T2 remains in the on state, forming a current path in the OLED. The first TFT T1 adjusts the amount of electric current flowing through the OLED according to the data voltage.

The duty driving period $T_{em}$ continues from the end of the programming period $T_w$ until the start of the reset period $T_i$ of the next frame. In the present disclosure, the pixels do not continuously emit light during the duty driving period Tem, but instead the pixels 20 emit light with a duty ratio of 50% or less by switching the emission signal on. When the emission signal is generated at ON level, the second TFT T2 turns on, forming a current path in the OLED. During the duty driving period Tem, the current $I_{oled}$, which is adjusted according to the gate-source voltage $V_{gs}$ of the first TFT T1, flows through the OLED and causes the OLED to emit light. During the duty driving period term, the first and second scan pulse SCAN1 and SCAN2 are kept at OFF level, and therefore the third and fourth TFTs T3 and T4 turn off.

The current $I_{oled}$ flowing through the OLED during the duty driving period Tem is as shown in Equation 1. The OLED emits light by this current and exhibits an input image's brightness.

$$Ioled = \frac{k}{2}[(1-C')(Vdata-Vref)]^2 \quad \text{[Equation 1]}$$

where k is a proportional constant which is determined by the mobility, parasitic capacitance, and channel capacity of the first TFT T1.

Since Vth is included in $V_{gs}$, which is programmed during the programming period $T_w$, $V_{th}$ is canceled out from the $I_{oled}$ in Equation 1. Accordingly, the effect of the threshold voltage $V_{th}$ of a driving element, i.e., the first TFT T1, on the current $I_{oled}$ in the OLED is eliminated.

FIG. 7 is a view showing the configuration of the data processor placed in the timing controller.

Referring to FIG. 7, the data processor 200 according to the present disclosure comprises a point-of-gaze determination part 210, a gaze area setting part 220, and an image data modulation part 230.

The point-of-gaze determination part 210 determines the point of the user's gaze based on images of the user's both eyes captured by a camera 100.

The camera 100 captures the user's left and right eyes to sense the positions of the pupils of the left and right eyes. The point-of-gaze determination part 210 detects the point of gaze from the user's left eye and the point of gaze from the user's right eye, based on the positions of the pupils sensed by the camera 100. The point-of-gaze determination part 210 may determine the point of gaze by using eye tracking technology.

The gaze area setting part 220 sets a gaze area, based on the point of gaze from the user's left or right eye detected by the point-of-gaze determination part 210. The gaze area is an area towards which the user's gaze is directed—that is, a pixel array area which is within the user's field of view.

The image data modulation part 230 regards the rest of the pixel array, excepting the gaze area, as a non-gaze area and modulates image data of the non-gaze area.

Figure 8:
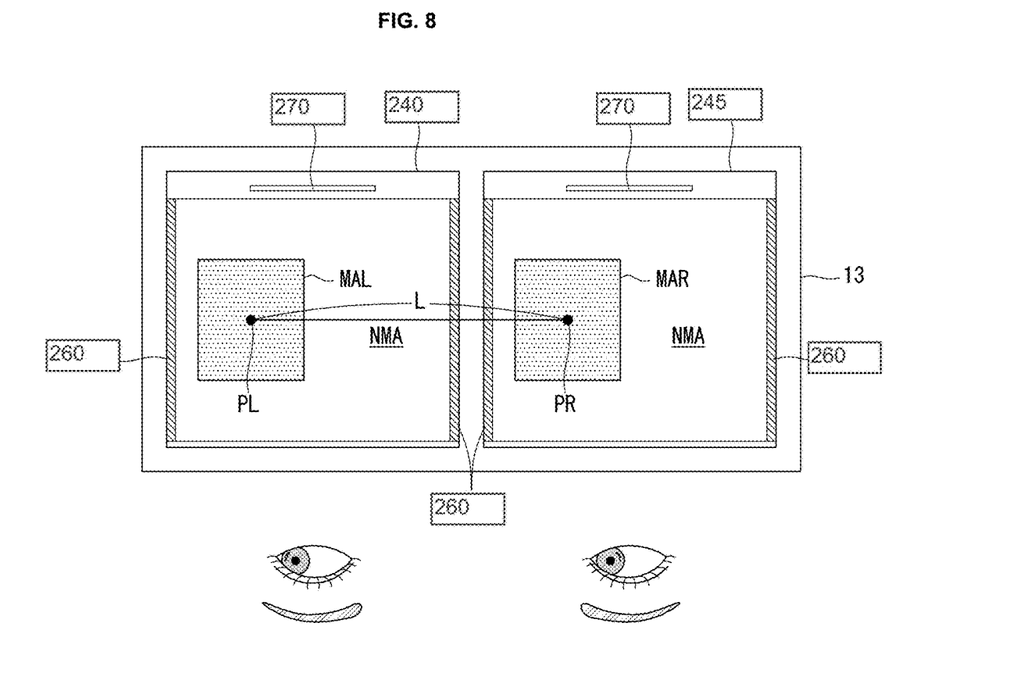
FIGS. 8 to 11 are schematic diagrams showing a method of detecting a gaze area.

FIG. 8 is a view showing a method in which the gaze area setting part sets a gaze area.

Referring to FIG. 8, the gaze area setting part 220 sets a first gaze area MAL in which the user's left eye looks at the first pixel array PNL1 240 and a second gaze area MAR in which the user's right eye looks at the second pixel array PNL2 245.

The first gaze area MAL is defined as an area of a certain size centered around the point PL of gaze from the left eye. The point PL of gaze from the left eye is a point on the first pixel array PNL1 240 where the user's left eye is looking, which, as mentioned above, is measured based on the point of gaze detected from a left-eye image captured by the camera 100. The second gaze area MAR is defined as an area of a certain size centered around the point PR of gaze from the right eye. The point PR of gaze from the right eye is a point on the second pixel array PNL2 245 where the user's right eye is looking, which, as mentioned above, is measured based on the point of gaze detected from a right-eye image captured by the camera 100.

The rest of the first pixel array PNL1 240, excepting the first gaze area MAL, is regarded as a non-gaze area NMA. The rest of the second pixel array PNL2 245, excepting the second gaze area MAR, is regarded as a non-gaze area NMA.

Figure 9:
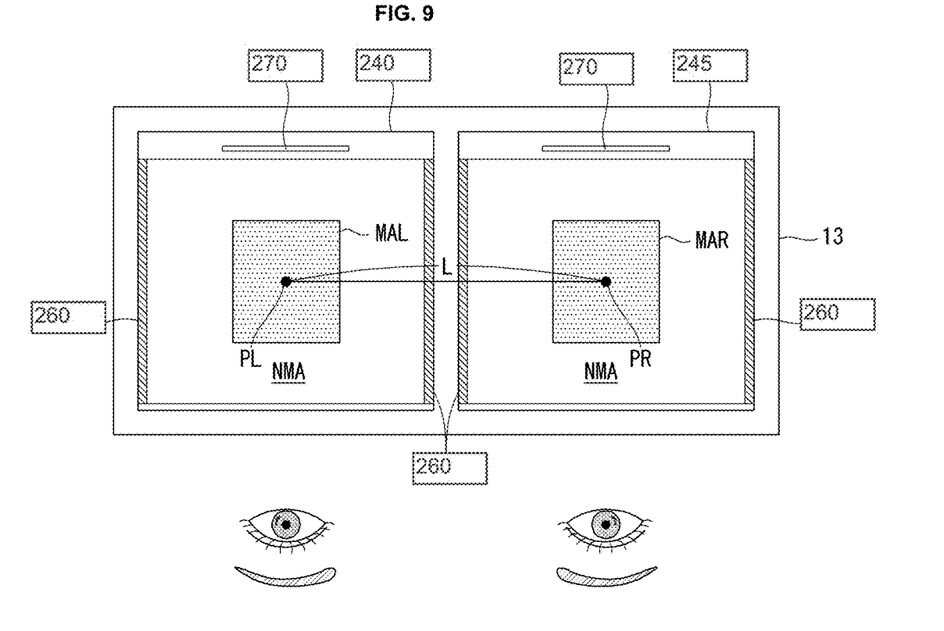
Figure 10:
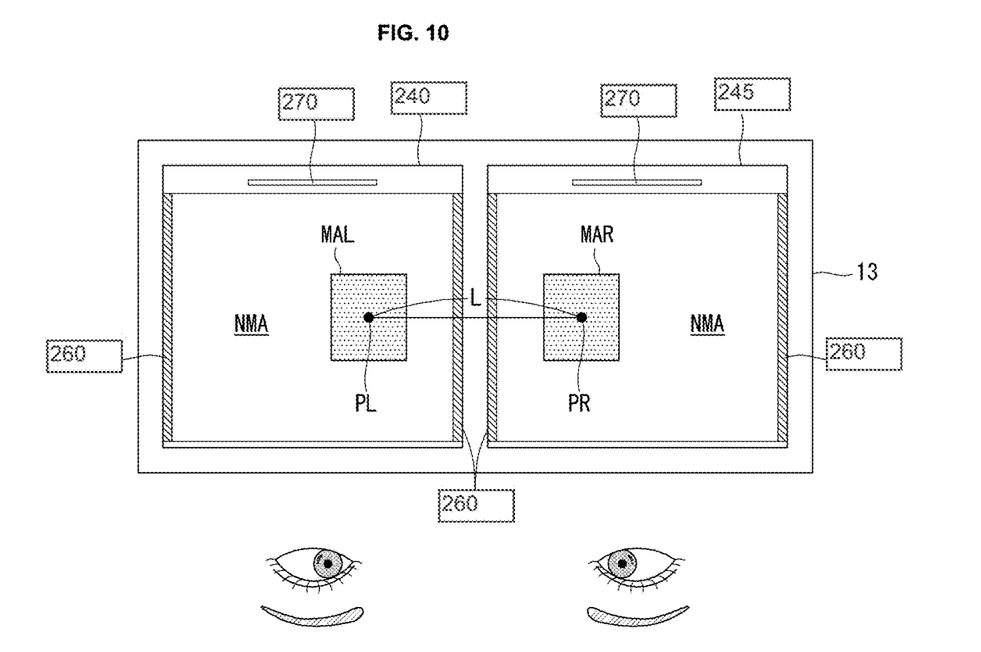
Figure 11:
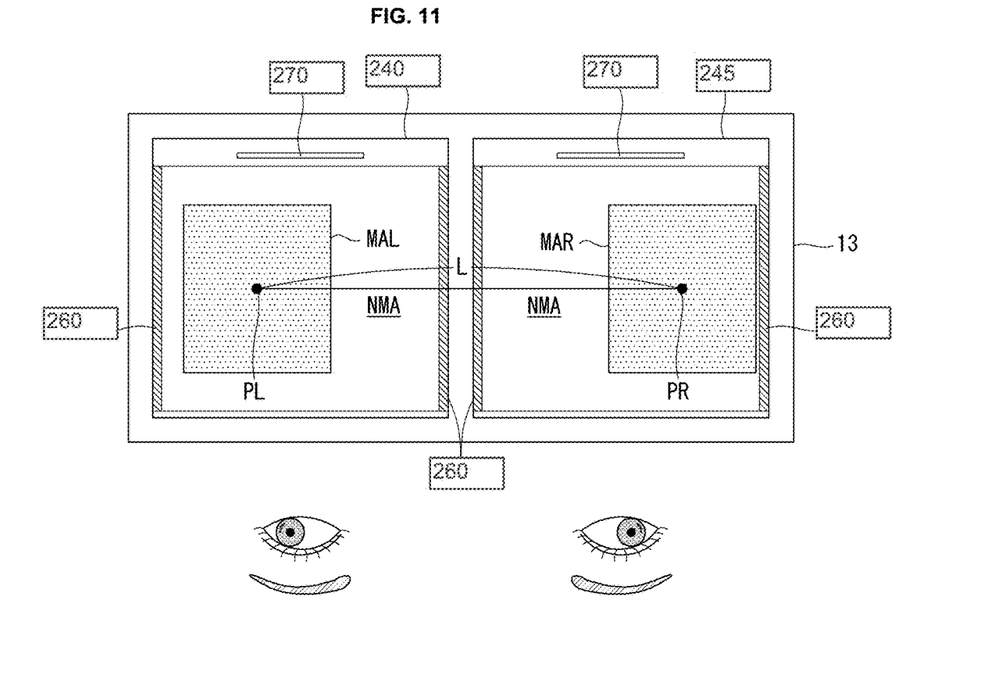

The size of the first gaze area MAL and second gaze area MAR may be set based on the distance between the points of gaze. Referring to FIGS. 9 to 11, a method of setting the size of the first gaze area MAL and second gaze area MAR will be described as follows.

FIG. 9 is a view of a person looking at the front of the first pixel array PNL1 240 and second pixel array PNL2 245, in which the distance L between the points of gaze is equal to the distance $L_e$ between the two eyes. The distance L between the points of gaze refers to the distance between the point PL of gaze from the left eye and the point PR of gaze from the right eye.

If the difference between the distance L between the points of gaze and the distance $L_e$ between the two eyes is below a preset threshold, the first gaze area MAL and the second gaze area MAR may be set to the size of a reference gaze area. The threshold is a value sufficient to determine that the distance L between the points of gaze and the distance $L_e$ between the two eyes are almost equal. When the distance L between the points of gaze is similar to the distance $L_e$ between the two eyes, it can be determined that the user is looking at a display image at a standard distance, rather than at a close distance or far distance. Thus, the reference gaze area may be defined as an area on a pixel array substrate which is within the field of view of the user looking at the standard distance.

FIG. 10 is a view illustrating that the distance between the points of gaze is shorter than the distance between the two eyes. This means that the user is looking at a relatively close distance. Thus, when the distance L between the points of gaze is shorter than the distance $L_e$ between the two eyes, the area where the user is looking is narrower than when the distance L between the points of gaze and the distance $L_e$ between the two eyes are similar. The shorter the distance L between the points of gaze is than the distance $L_e$ between the two eyes, the larger the difference obtained by subtracting the distance L between the points of gaze from the distance $L_e$ between the two eyes. Thus, if the difference obtained by subtracting the distance L between the points of gaze from the distance $L_e$ between the two eyes is equal to or greater than the threshold, the gaze area setting part 220 decreases the size of the first and second gaze areas MAL and MAR to a size smaller than the reference gaze area.

FIG. 11 is a view illustrating that the distance between the points of gaze is longer than the distance between the two eyes. This means that the user is looking at a relatively far distance. Thus, when the distance L between the points of gaze is longer than the distance $L_e$ between the two eyes, the area where the user is looking is wider than when the distance L between the points of gaze and the distance Le between the two eyes are similar. The longer the distance L between the points of gaze is than the distance Le between the two eyes, the larger the difference obtained by subtracting the distance Le between the two eyes from the distance L between the points of gaze. Thus, if the difference obtained by subtracting the distance $L_e$ between the two eyes from the distance L between the points of gaze is equal to or greater than the threshold, the gaze area setting part 220 increases the size of the first and second gaze areas MAL and MAR to a size larger than the reference gaze area.

Figure 12:
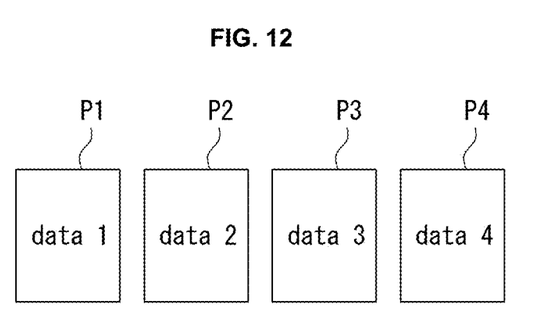
FIGS. 12 and 13 are views illustrating examples of a data voltage applied to pixels.
Figure 13:
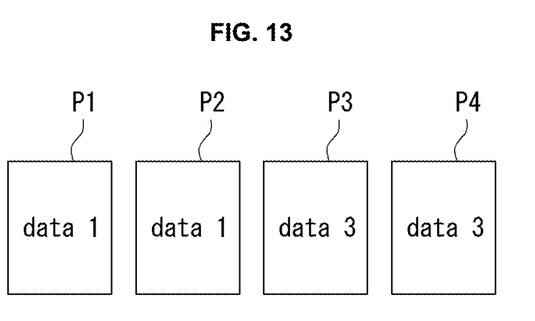

FIGS. 12 and 13 are views illustrating examples of image data modulated by an image data modulation part.

FIG. 12 is a view illustrating a data voltage applied to pixels in a non-gaze area according to a comparative example. FIG. 13 is a view illustrating a data voltage applied to pixels in a non-gaze area according to the present disclosure.

In general, respective data is written to first to four pixels P1 to P4, as shown in FIG. 12.

The image data modulation part 230 reduces the resolution of the pixels in the non-gaze areas NMA within the first and second pixel arrays PNL1 and PNL2. The image data modulation part 230 may reduce the resolution of the non-gaze areas NMA by writing the same image data to a pair of adjacent pixels. For example, if first to fourth pixels P1 to P4 are within a non-gaze area NMA, the image data modulation part 230 may write a first data voltage data1 to the first and second pixels P1 and P2 and a third data voltage data3 to the third and fourth pixels P3 and P4. In this way, the image data modulation part 230 can reduce the power consumption of the data driver in the drive IC (DIC) by reducing the resolution of the non-gaze area NMA.

Since the image data modulation part 230 reduces the resolution of the non-gaze area NMA, the drive IC (DIC) does not need to receive image data of every pixel. Thus, the drive IC does not receive all image data of the pixels in the non-gaze area but only receives image data of odd- or even-numbered pixels. Therefore, the present disclosure can reduce the amount of data received by the drive IC (DIC). When it is desired to keep the amount of data received by the drive IC (DIC) constant, fast driving may be performed by increasing frame driving frequency.

Moreover, the image data modulation part 230 may turn down the brightness of the pixels in the non-gaze area NMA to a lower level. That is, the image data modulation part 230 may reduce the degree of deterioration in the pixels in the non-gaze area by turning down the data written to the pixels in the non-gaze area NMA to a value lower than the data fed from a host or received by the data processor.

The above-described exemplary embodiments have been with respect to a personal immersive display which displays a left-eye image and a right-eye image on respective display panels.

The exemplary embodiments of the present disclosure are also applicable to personal immersive displays, which display an image on a single display panel.

Figure 14:
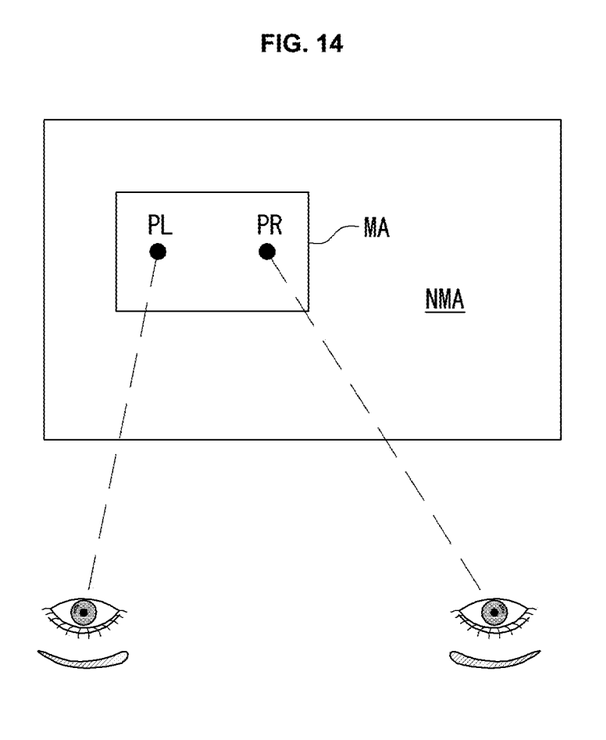
FIG. 14 is a schematic diagram showing a method of detecting a gaze area.

FIG. 14 is a view illustrating how a gaze area is detected, in a personal immersive display which displays an image on a single display panel.

Referring to FIG. 14, the point-of-gaze determination part 210 detects the point PL of gaze from the left eye and the point PR of gaze from the right eye based on images acquired by the camera 100. The point-of-gaze determination part 210 detects a gaze area MA of a certain size around the point PL of gaze from the left eye and the point PR of gaze from the right eye. The size of the gaze area MA may be measured based on the distance between the point PL of gaze from the left eye and the point PR of gaze from the right eye. The image data modulation part 230 may reduce the resolution of a non-gaze area NMA, which is not within the gaze area MA. Alternatively, the image data modulation part 230 may reduce a data voltage written to the pixels in the non-gaze area NMA.

The present disclosure can enhance the sense of reality in an image the user is watching by focusing on the area where the user is looking, based on the point of the user's gaze.

Moreover, the present disclosure can reduce power consumption by controlling image data in the area where the user is not looking.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A personal immersive display device comprising:
a personal immersive display including a first display panel, a second display panel, and a camera;
the first display panel to which first content data is provided;
the second display panel to which second content data is provided;
the camera receives data associated with positions of a user's left pupil and right pupil;
a data processor that processes the data associated with the position of the user's left pupil and right pupil to determine a right gaze point and a left gaze point, detects a first gaze area on the first display panel and a second gaze area on the second display panel based on the right gaze point and left gaze point, wherein the data processor reduces resolution or brightness of the first and second content data provided to areas outside the first gaze area and second gaze area; and
wherein the data processor sets the first gaze area centered around the left gaze point and the second gaze area centered around the right gaze point, wherein the first gaze area and second gaze area are set based on a distance between the left and right gaze points.

2. The personal immersive display device of claim 1, wherein, if a difference between a distance between the left and right gaze points and a distance between the two pupils is below a preset threshold, the first and second gaze areas are set to a size of a reference gaze area, and if the difference obtained by subtracting the distance between the two pupils from the distance between the left and right gaze points is equal to or greater than the preset threshold, the size of the first and second gaze areas is set to a size larger than the reference gaze area.

3. The personal immersive display device of claim 2, wherein, if the difference obtained by subtracting the distance between the right and left gaze points from the distance between the two pupils is equal to or greater than the preset threshold, the size of the first and second gaze areas are set to a size smaller than the reference gaze area.

4. The personal immersive display device of claim 1, wherein the data processor provides the first content data to a first pixel and a second pixel in the areas outside the first gaze area of the first display panel and the second content data to a third pixel and a fourth pixel in the areas outside the second gaze area of the second display panel.

5. The personal immersive display device of claim 1, wherein the data processor reduces the data provided to the pixels outside the first and second gaze areas to an amount lower than the data received by the data processor.

6. The personal immersive display device of claim 1, further comprising a first drive circuit and a second drive circuit, and wherein the first display panel is driven by the first drive circuit and the second display panel is driven by the second drive circuit.

7. A method of driving a personal immersive display device, the method comprising:
providing first image data for a left eye to a first pixel array;
providing second image data for a right eye to a second pixel array;
capturing a first position of the left eye and a second position of the right eye;
detecting a left gaze point based on the first position and a right gaze point based on the second position;
detecting a first gaze area on the first pixel array based on the left gaze point and a second gaze area on the second pixel array based on the right gaze point;
reducing a resolution or a brightness of the first and second image data provided to areas outside of the first and second gaze areas; and
wherein the detecting of the first and second gaze areas comprises: setting the first gaze area centered around the left gaze point and the second gaze area centered around the right gaze point, wherein the first gaze area and second gaze area are set based on a distance between the left and right gaze points.

8. The method of claim 7, wherein, if a difference between the distance between the left and right gaze points and a distance between the two eyes is below a preset threshold, the first and second gaze areas are set to a size of a reference gaze area, and if the difference obtained by subtracting the distance between the two eyes from the distance between the first and second gaze points is equal to or greater than the preset threshold, the size of the first and second gaze areas is set to a size larger than the reference gaze area.

9. The method of claim 8, wherein, if the difference obtained by subtracting the distance between the right and left gaze points from the distance between the two eyes is equal to or greater than the preset threshold, the size of the first and second gaze areas are set to a size smaller than the reference gaze area.

10. The method of claim 7, wherein the first image data is provided to a first pixel and a second pixel in the areas outside the first gaze area of the first pixel array and the second image data is provided to a third pixel and a fourth pixel in the areas outside the second gaze area of the second pixel array by a data processor.

11. The method of claim 7, wherein the data provided to pixels outside the first and second gaze areas is reduced by a data processor to an amount lower than the image data received by the data processor.

12. The method of claim 7, wherein the personal immersive display device includes a first drive circuit and a second drive circuit, and wherein the first pixel array is driven by the first drive circuit and the second pixel array is driven by the second drive circuit.

13. A personal immersive display device comprising:
one or more processors; and
a computer-readable medium including one or more sequences of instructions which, when executed by the one or more processors, cause:
providing first image data for a left eye to a first pixel array;
providing second image data for a right eye to a second pixel array;
capturing a first position of the left eye and a second position of the right eye;
detecting a left gaze point based on the first position and a right gaze point based on the second position;
detecting a first gaze area on the first pixel array based on the left gaze point and a second gaze area on the second pixel array based on the right gaze point;
reducing a resolution or a brightness of the first and second image data provided to areas outside of the first and second gaze areas; and
wherein the detecting of gaze areas comprises: setting the first gaze area centered around the left gaze point and the second gaze area centered around the right gaze point, wherein the first gaze area and second gaze area are set based on a distance between the left and right gaze points.

14. The personal immersive display device of claim 13, wherein, if the difference between the distance between the left and right gaze points and a distance between the right and left eyes is below a preset threshold, the first and second gaze areas are set to a size of a reference gaze area, and if the difference obtained by subtracting the distance between the right and left eyes from the distance between the left and right gaze points is equal to or greater than the preset threshold, the size of the first and second gaze areas is set to a size larger than the reference gaze area.

15. The personal immersive display device of claim 14, wherein, if the difference obtained by subtracting the distance between the right and left gaze points from the distance between the right and left eyes is equal to or greater than the preset threshold, the size of the first and second gaze areas are set to a size smaller than the reference gaze area.

16. The personal immersive display device of claim 13, wherein the processor provides the first image data to a first pixel and a second pixel in the areas outside the first gaze area of the first pixel array and the second image data to a third pixel and a fourth pixel in the areas outside the second gaze area of the second pixel array.

17. The personal immersive display device of claim 13, wherein the processor reduces the data provided to the pixels outside the first and second gaze areas to an amount lower than the image data received by the processor.

* * * * *